Patented Nov. 18, 1930

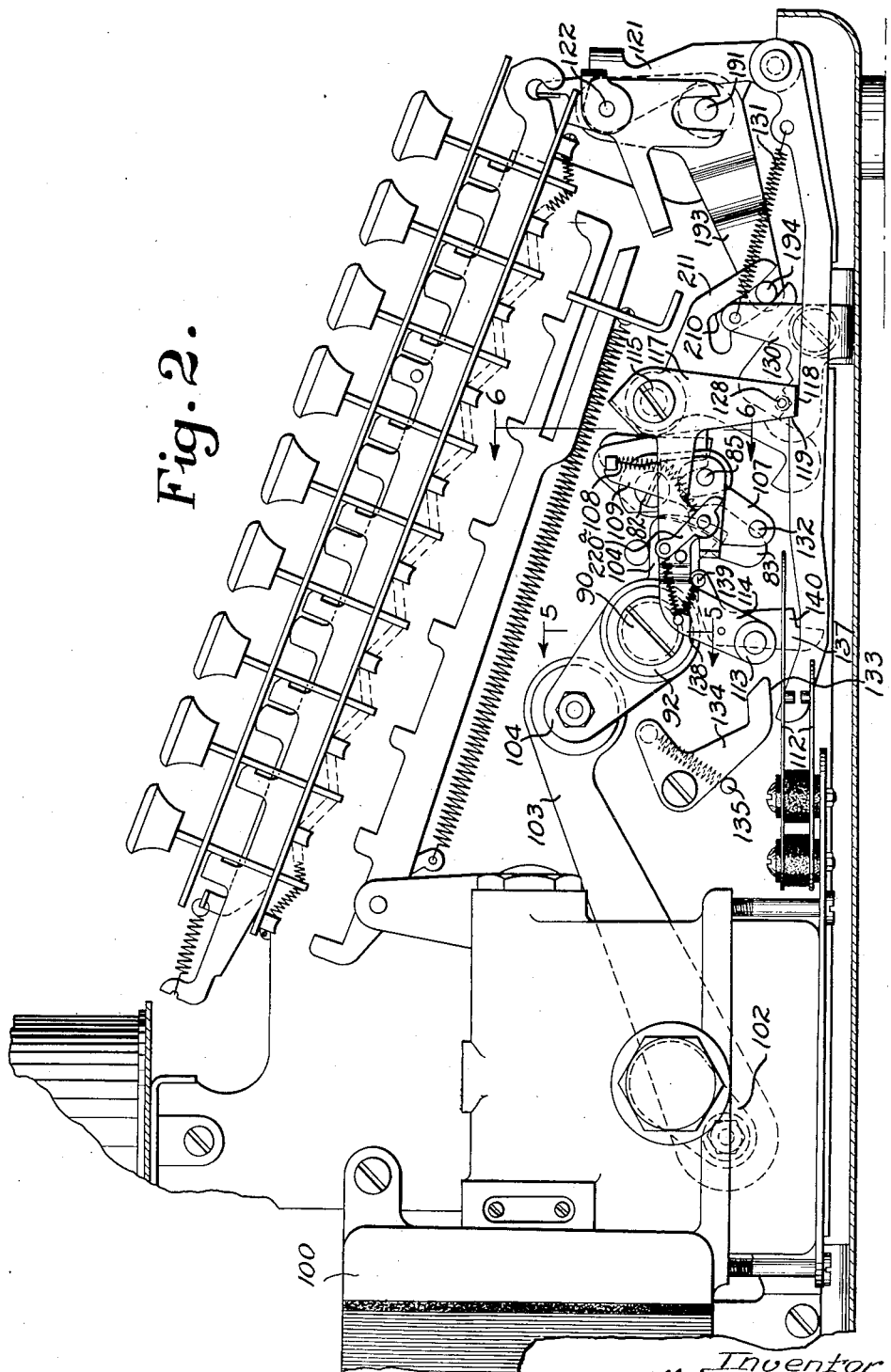

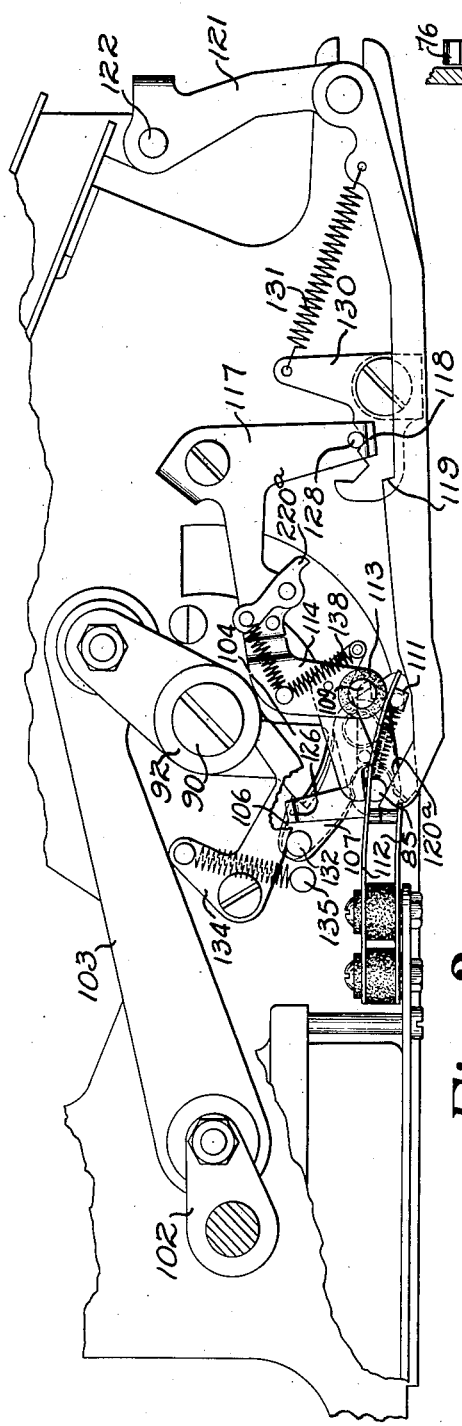
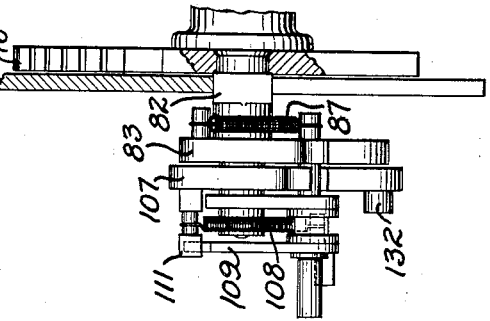
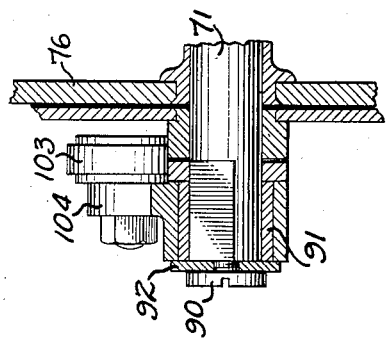
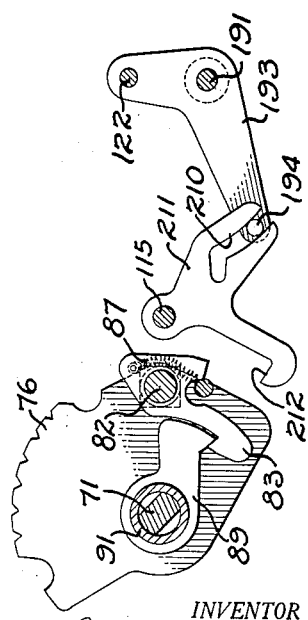

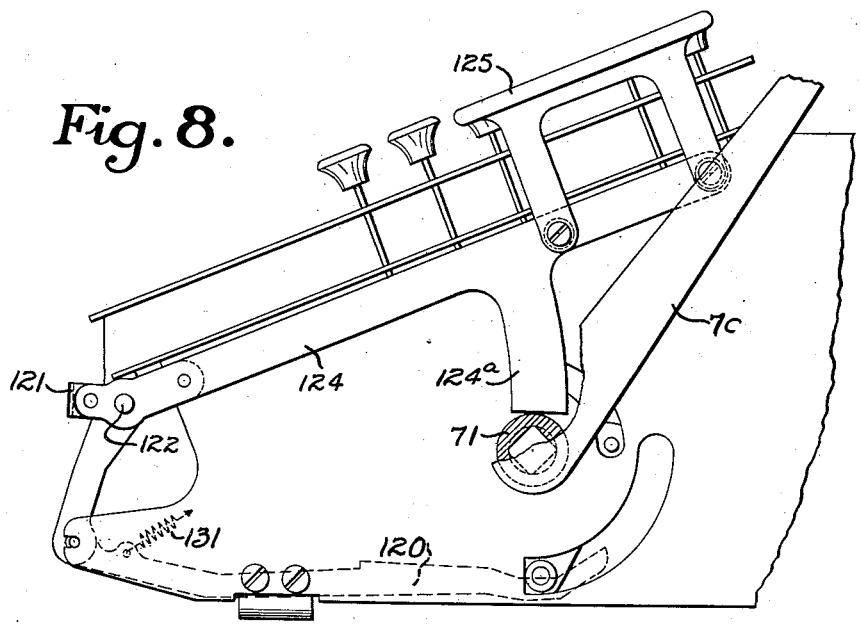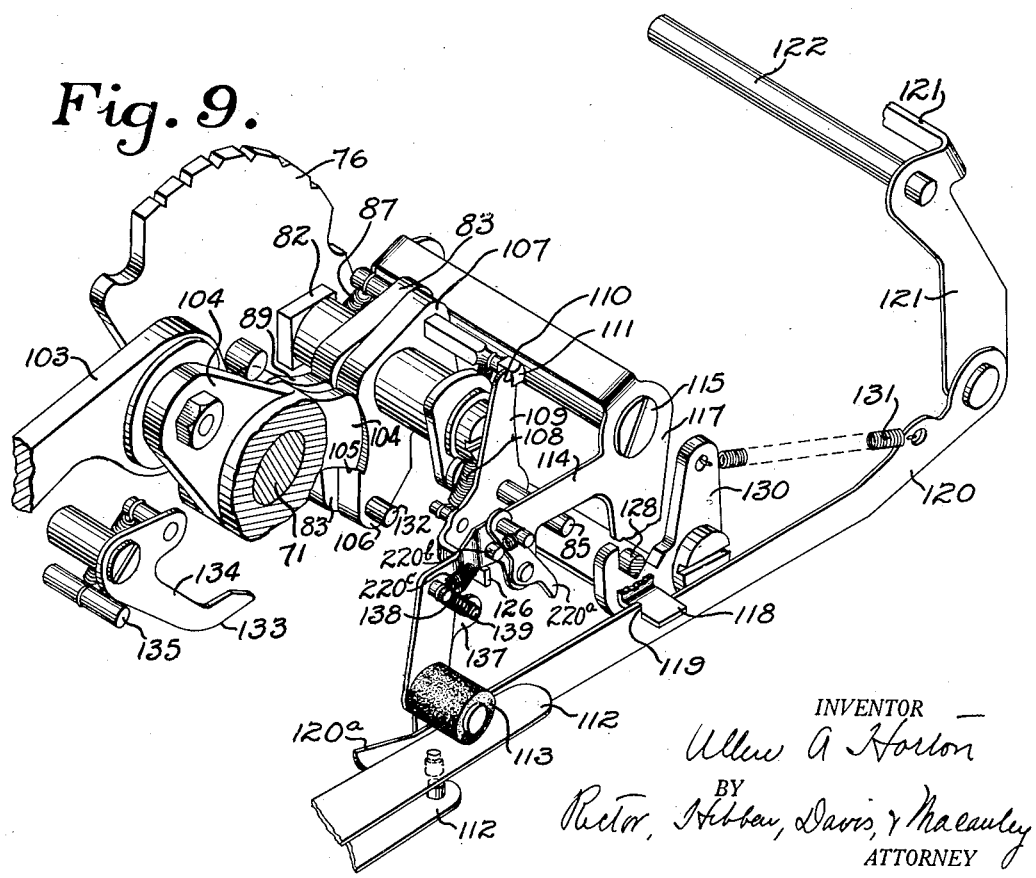

1,781,689

UNITED STATES PATENT OFFICE

ALLEN A. HORTON, OF PLYMOUTH, MICHIGAN, ASSIGNOR TO BURROUGHS ADDING MACHINE COMPANY, OF DETROIT, MICHIGAN, A CORPORATION OF MICHIGAN

CONTROLLING MECHANISM FOR POWER-DRIVEN CALCULATING MACHINES

Original application filed January 29, 1926, Serial No. 84,616. Divided and this application filed December 30, 1926. Serial No. 158,078.

This invention relates to a controlling mechanism for power driven calculating machines, the present application being a division of copending application, Serial No. 84,616, filed January 29, 1926. It relates particularly to the electric switch mechanism and associated parts for controlling the motor drive of a calculating machine.

The object of the invention is to provide an improved power drive for calculating machines.

A more particular object is to provide an improved means for disconnecting the operating mechanism from the driving means at the end of the forward stroke of the machine together with means for opening the switch after the mechanism has been disconnected.

Another object is to provide an improved switch mechanism that will prevent the machine from being operated twice when the touch bar or switch operating member is held down longer than necessary.

A further object is to provide, in a calculating machine having means for automatically disconnecting the machine from operating mechanism when the machine has not been properly conditioned for operation, means for opening the electric switch when the mechanism is so disconnected.

Other objects and advantages of the invention will hereinafter appear.

An embodiment of the invention is illustrated in the accompanying drawings in which;

Fig. 2 is a side elevation of the left side of the machine showing particularly the switch mechanism and the motor connections.

Fig. 3 is a side elevation of the switch mechanism.

Fig. 4 is a detail fragmentary side view showing the driving pawl connections and the lever for disabling the same when the machine is operated when not properly conditioned for operation.

Fig. 5 is a detail section taken on the line 5—5 of Fig. 2.

Fig. 6 is a sectional rear view of the pawls and latch carried by the full stroke sector taken on the line 6—6 of Fig. 2.

Fig. 8 is a fragmentary side elevation of the right hand side of the machine showing the touch bar for operating the switch.

Fig. 9 is a separated perspective illustrating the switch and its associated parts.

Figure 1:
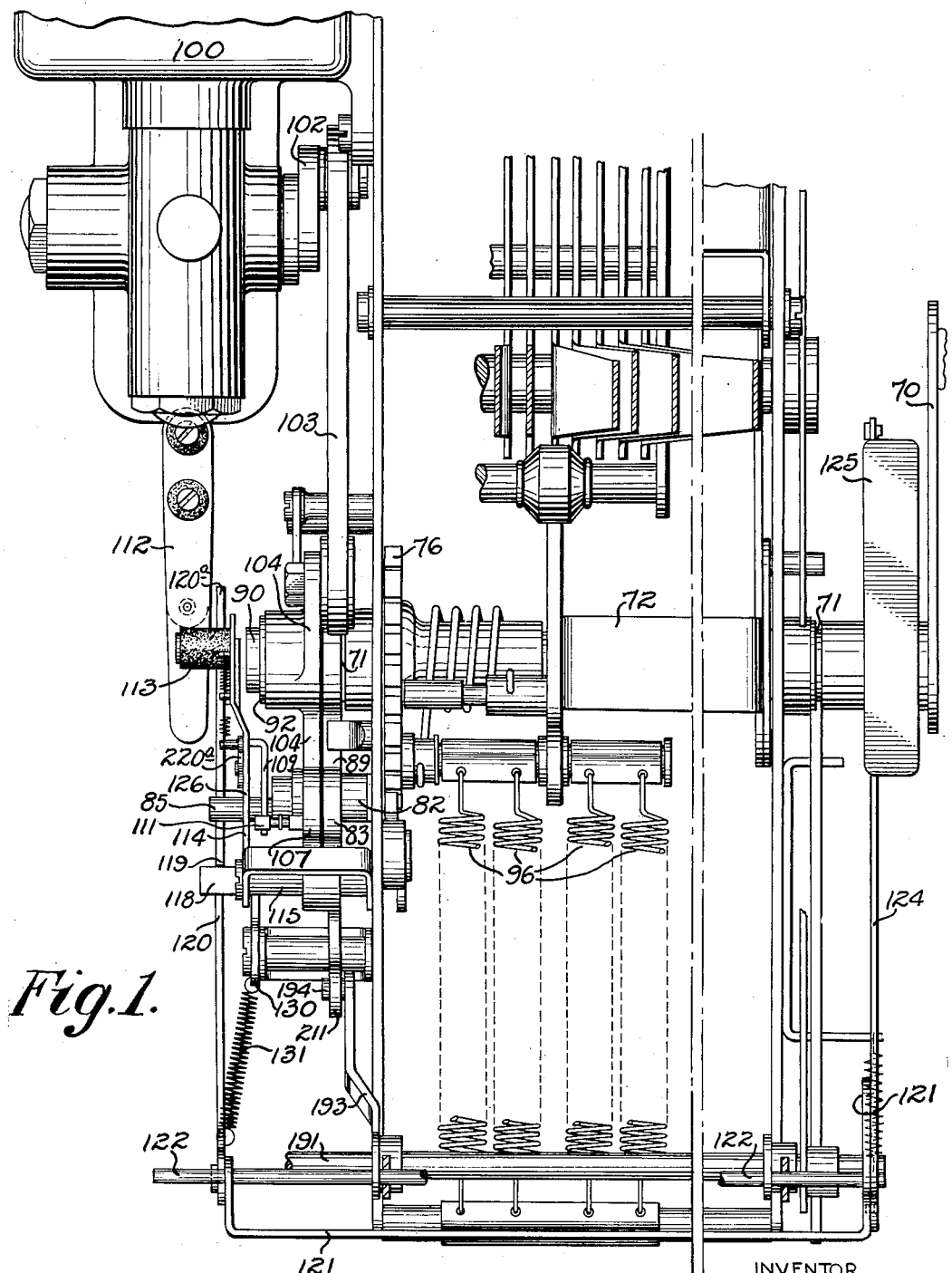
Fig. 1 is a plan view of a portion of the calculating machine showing the motor, its connection, and the switch mechanism for controlling it.
Figure 7:
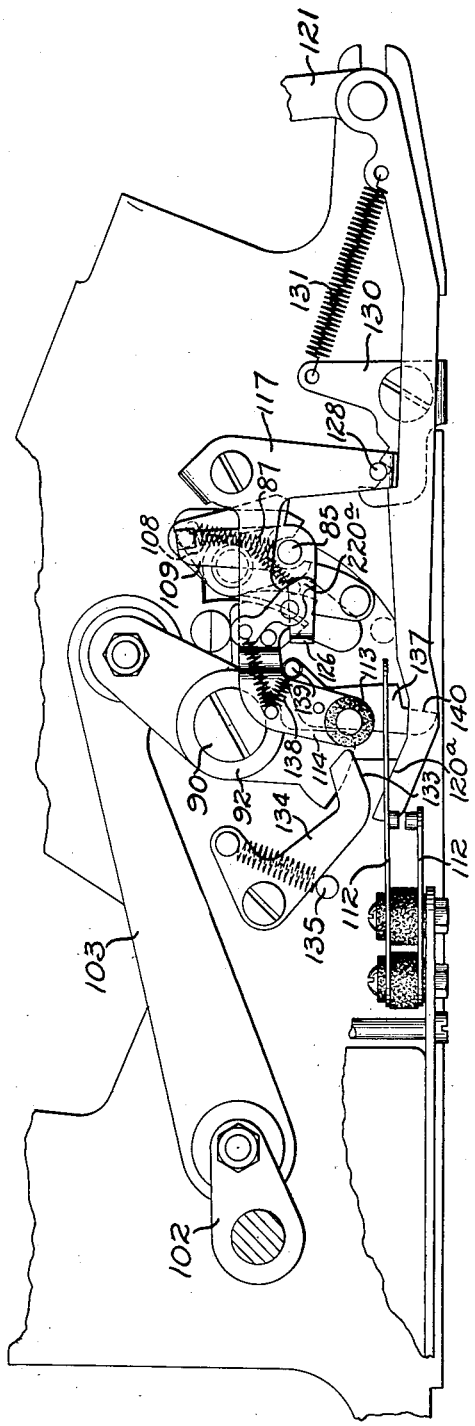
Fig. 7 is a view similar to Fig. 3 with the parts shown in a different position.

An understanding of the details of the calculating machine proper is not necessary for the purposes of this application, the same having beeen fully disclosed in the parent application heretofore mentioned, and no attempt will be made to describe anything but the parts pertinent to the present invention.

The machine is arranged to be either hand or motor driven through a full stroke sector 76 (Fig. 1) having a resilient connection with a driving yoke 72 which is arranged to operate various mechanisms of the machine. When the driving yoke 72 is pulled forwardly, restoring springs 96 are tensioned, and when the handle of the machine is released or the motor drive is disconnected at the end of the forward stroke, these springs serve to return the mechanism to its normal position.

The full stroke sector 76 carries a rather long stud 82 on which are mounted two hook-shaped driving pawls 83 and 107, one of which, 83, is clearly illustrated in Fig. 4. The pawl 83 is normally urged by a spring 87 into the path of an arm 89 fixed to the shaft 71 which is operated by the handle 70 of the machine. The pawl 107 which is similar to the pawl 83 is normally moved by a spring 108 into the path of a similar arm 104 which is rocked back and forth by the pitman 103 and the crank 102 driven by the motor. Under normal conditions, when the handle 70 is operated, the arm 89 will engage the pawl 83 and move the full stroke sector 76 to operate the machine. In like manner the arm 104 will engage the pawl 107 when the motor is operated. Pivoted on the shaft 115, as shown in Fig. 4 is a tripping member 211 having a shoulder 212 normally in the paths of both of the pawls 83 and 107. Unless this tripping pawl is moved out of the paths of these pawls, it will engage the two pawls and swing them about their pivots to disengage whichever one has been engaged with its operating arm. If this occurs, the full stroke sector 76 will be disconnected from the operating means and the restoring springs 96 will return the mechanism to normal position without its having been operated. Means is provided, however, for normally moving the tripping pawl 211 out of the path of the pawls 83 and 107. This means includes an arm 193 having a stud 194 operating in slot 210 in the member 211. The arm 193 is pivoted on the shaft 122 and controlled by a control rod 191. When the machine is properly conditioned for operation, and as it is operated, the pin 194 swings upwardly in the slot 210 and strikes the top of the slot after which it moves the member 211 counter clockwise to move the shoulder 212 out of the paths of the pawls 83 and 107. If, however, the machine is not properly conditioned for operation, the stud 194 will not strike the top of the slot 210 and the member 211 will not be moved out of the paths of the pawls under the latter condition, the mechanism will be automatically disconnected from the operating means. The details of this automatic disconnecting feature are explained in said copending application, and are not necessary for an understanding of the present invention.

The electric drive is by means of a motor 100 illustrated in Fig. 1 operating a crank 102 connected by a pitman 103 to the crank arm 104. This crank arm is journaled on a sleeve 91 (Fig. 5) on the shaft 71 operated by the handle of the machine. The crank arm and sleeve are held in position by the washer 92 and a headed screw 90. This mounting permits the crank arm operated by the motor to be rocked independently of the shaft 71 operated by the handle and vice versa. When the motor is operated it moves the pitman 103 and arm 104 from the position shown in Fig. 2, to that shown in Fig. 3 and back again.

The switch for closing the circuit to the motor comprises two contact strips 112, the upper one of which is adapted to be moved into engagement with the lower by means of an insulated stud 113 on a switch lever 114 pivoted on a fixed stud 115 by means of a yoke formed on the lever. The switch lever has a downwardly extending arm 117 provided with a lateral lug 118 engaged by a shoulder 119 on the switch operating member 120. The member 120 is pivoted to one arm of a yoke 121 which in turn is pivoted to the shaft 122 of the machine. This yoke 121 extends across the front of the machine as shown in Fig. 1, and at the right hand side it is connected to an arm 124, Fig. 8, carrying a touch bar 125 which is positioned adjacent the control keys on the keyboard. The member 124 has a downwardly extending projection 124ª which, when the handle 70 is on the shaft 71, engages the collar of the handle and prevents the touch bar from being depressed. This prevents the circuit to the electric motor being completed when the handle is on the machine.

Depression of the touch bar when the handle is not on the machine rocks the yoke 121 counter clock-wise as viewed in Fig. 9, which draws the member 120 forwardly and through the engagement of its shoulder 119 with the lug 118 on the arm 117, rocks the lever 114 to carry the stud 113 into engagement with the upper contact strip 112 to move it into engagement with the lower strip to close the switch. The motor then moves the crank arm 104 forward or counter clock-wise as viewed in Fig. 9. The switch lever 114 is normally held in its open position as shown in Fig. 9 by the engagement of a stud 128 on its downwardly extending arm 117 in the rear one of the two notches in the rearwardly extending arm of the bell crank lever 130 journaled on a stud on the machine frame. A spring 131 connected at one end to the member 120 and at its opposite end to the vertically extending arm of the lever 130 normally urges the arm 120 upwardly and also normally urges the lever 130 in a clock-wise direction. When the lever 114 is rocked to open the switch, it is temporarily held in its open position by engagement of the stud 128 in the front notch of the bell crank lever 130.

The driving connections between the motor and the operating mechanism of the machine are normally disconnected owing to the fact that the pawl 107 is normally latched out of the path of the arm 104 by means of the latch 109 engaging over the square stud 111. As the switch is closed, however, the arm 114 strikes a lateral lug 126 on the latch 109 and rocks it out of engagement with the square stud 111, thereby permitting the spring 108 to rock the pawl 107 clockwise into the path of the arm 104. If the latch 109 is tripped when the crank arm 104 is in the position shown in Fig. 2, the nose 106 of the pawl 107 snaps under the shoulder 105 on the lever 104 and the parts are connected together immediately. However, the lever 104 may have been brought to rest at some other position at the end of the preceding operation, so that the nose 106 cannot be moved under the shoulder 105. When this condition exists the motor moves the arm 104 through a forward and a return stroke of movement and upon the return stroke and when the arm 104 reaches the proper position, the nose 106 on the pawl 107 is snapped under shoulder 105.

After the motor has given the machine a forward stroke of movement it is desirable to disconnect the operating mechanism from the motor and means is provided for this purpose. As the mechanism reaches the end of its forward stroke a stud 132 on the pawl 107 engages under the cam edge 133 of a bell crank lever 134 pivoted on the side frame of the machine and normally held against the limit stop 135 by a spring. When the stud engages this cam edge the lever 134 is raised until its forward end engages the boss or hub of the crank arm 104 which limits its movement. The lever 134 thereupon cams the pawl 107 counter-clock-wise to carry its nose 106 out of engagement with the shoulder 105. This releases the operating mechanism from the driving crank arm 104 and the restoring springs 96 restores the mechanism to normal position.

This provision for disconnecting the operating means from the motor drive insures that the operating mechanism will not be affected by movements of the motor farther than desired.

When the pawl 107 is rocked counter-clockwise as above described, the latch 109 snaps into its latching position with its shoulder 110 under the pin 111, thus latching the pawl 107 in its normal position out of the path of arm 104.

Inasmuch as the motor is disconnected from the operating mechanism after the latter has been given a forward stroke, it is desirable that the switch for the motor be opened so that the motor will stop. Provision is made for opening the switch by means of the return movement of the mechanism under the influence of the restoring springs 96. A pawl 137 is pivoted on the switch lever 114 and a spring 138 normally holds a limit stud 139 on the pawl in engagement with the lower edge of the lever. Near the end of the forward stroke of the machine the pin 85 engages the forward edge of the pawl 137 and rocks it against the tension of the spring 138. The pin passes the shoulder 140 on the pawl and, upon the return movement of the parts, the pin engages this shoulder (Fig. 3), and through the pawl 137, rocks the switch lever 114 to open position. The pin 85 moves out of engagement with the shoulder 140 as the lever 114 moves to normal position.

The switch is normally closed by a momentary movement of the touch bar which draws the member 120 forward. When the touch bar is released, a spring 131 draws the member 120 rearwardly and restores both it and the touch bar to normal position. This moves the shoulder 119 on the member 120 rearward so that the lever 114 can again be rocked clock-wise to open the switch. However, if the operator should hold the touch bar down for a longer period than necessary, the shoulder 119 might be maintained in the path of the lug 118 and thereby prevent the switch arm 114 from being rocked to open the switch. This would mean that the motor would continue to operate and the machine might be operated more than once by the action of holding the touch bar down longer than necessary. To prevent this the arm 120 is extended rearwardly and curves upwardly to provide a cam surface 120$^a$ as shown in Fig. 1. When the member 120 is drawn forwardly as when the touch bar is depressed, the cam surface 120$^a$ is in the path of the pin 85 as the latter moves to the position illustrated in Fig. 3. Consequently, if the touch bar is held down longer than necessary, the pin 85 cams the arm 120 downwardly against the tension of the spring 131 and moves the shoulder 119 out of the path of the lug 118 so that the shoulder will not interfere with the return movement of the member 114. This insures that the switch will be opened even though the touch bar is held down and the machine will be given only one stroke no matter how long pressure is applied to the touch bar.

It should also be noted that the above described mechanism automatically disconnects the switch operating member 114 from the touch bar or, in other words, disables the control of the switch by the touch bar so that the switch cannot be operated a second time until the touch bar is allowed to return to normal.

It may happen that the switch will be closed when the machine is not properly conditioned for operation, in which event the motor drive is disconnected from the operating mechanism as the machine starts to operate. Under these conditions it is desirable to again open the switch, but since the means for opening the switch heretofore described depends upon the return of the operating mechanism, the switch cannot be opened in this way because the operating mechanism may not have moved far enough forward to permit the pin 85 to engage the shoulder 140 on the pawl 137. To insure that the switch will be opened under these conditions, a pass-by pawl 220$^a$ (Fig. 9) has been provided. This pawl is mounted on the switch arm 114 and normally held in engagement with a limit stud 220$^b$ by the spring 220$^c$. Its location is such that the pin 85 passes by it during the very short stroke given to the mechanism before it is automatically disconnected as hereinbefore explained. Then, when the parts move back to normal position under the influence of the restoring springs 96, the pin 85 strikes the under side of the pass-by pawl 220$^a$ which being limited by the stud 220$^b$, forms a rigid extension of the switch arm 114 and the pin 85 thereby rocks the arm to open the switch. As the arm 114 moves back to its normal position, the pin 85 passes the end of the pass-by pawl.

The various parts are proportioned so that the automatic disconnection takes place before the full stroke pawl becomes operative to prevent the return of the operating mechanism to normal. It might be thought, at first glance, that the switch member 117 could not be rocked back to normal by stud 85 contacting pawl 220ª because the shoulder 119 would be holding lug 118 of switch member 117. However, the motor touch bar is ordinarily released immediately after depression and, when released, it moves back to normal which moves arm 120 to the left in Fig. 2 and frees the switch member 117. If the touch bar were not released quick enough or even if it were held down, no damage would result. The stud 85 would strike the pass-by pawl 220ª and be blocked which would block the return of the operating mechanism of the machine under the influence of its springs. This blocking would not be noticeable if caused by lack of quickness on the part of the operator in releasing the motor bar as the motor bar would be released in a fraction of a second and the parts would move to normal. If the motor bar should be held down, the return of the stud 85 and the operating mechanism of the machine would be blocked by the pass-by pawl 220ª and the switch would remain closed but the motor could do nothing but pick up the machine and immediately release it again owing to the operation of the automatic disconnecting mechanism. As soon as the operator released the motor bar the parts will move to normal.

There has thus been provided a switch mechanism which can be easily closed to complete the circuit to the electric motor for giving the calculating machine a stroke of movement. At the end of the forward stroke, the operating mechanism of the machine is disconnected from the electric drive and, as the mechanism is returned to normal position it opens the switch. If the automatic disconnecting feature operates to disconnect the operating mechanism from the electric drive at the beginning of the forward stroke, the switch is nevertheless opened by the means heretofore described. Should the touch bar be held down longer than necessary, the machine will not be given more than one stroke of operation as the position of the touch bar cannot interfere with the opening of the switch.

It is to be understood that the structure shown is for purposes of illustration and that variations may be made in it without departing from the spirit and scope of the invention as defined by the claims.

I claim:

1. The combination in a calculating machine of an operating mechanism, an electric motor for driving said mechanism, a switch for the motor, a motor starting bar, connections between the operating mechanism and the motor, said connections being normally in disconnected position, and means operated by movement of the motor starting bar for closing the switch and for connecting the operating mechanism to the motor.

2. The combination in a calculating machine of an operating mechanism, an electric driving means therefor, a pawl urged toward a position to connect the operating mechanism to the driving means, a latch for restraining the pawl, an electric switch adapted to be closed to start the driving means, and an operating member for closing the switch, said operating member engaging said latch to release said pawl as said member is moved to close said switch.

3. The combination in a calculating machine of an operating mechanism, an electric motor for oscillating a driving arm, a connecting pawl carried by said operating mechanism and normally out of the path of movement of said driving arm, an electric switch for starting the motor, and means operated by the closing of the switch for causing the pawl to be moved into the path of the driving arm to connect the operating mechanism to the motor.

4. The combination in a calculating machine of an operating mechanism, an electric motor, a driving arm oscillated by said motor, a connecting pawl carried by the operating mechanism, said pawl being normally urged into the path of the driving arm but being held out of said path by a latch, and an electric switch mechanism serving, when moved, to start the motor and to move the latch to release the connecting pawl to permit the pawl to move into the path of the driving arm to connect the operating mechanism to the motor.

5. The combination in a calculating machine of an operating mechanism having a forward and a return stroke of movement, an electric driving means therefor, a pawl urged toward a position to connect the operating mechanism to the driving means, a latch for restraining said pawl, an electric switch adapted to be closed to start the driving means, an operating member for the switch, said operating member engaging said latch to release said pawl as said member is moved to close the switch, and means carried by the operating mechanism and engaging said operating member during the return stroke of said mechanism for returning said member to open said switch.

6. The combination in a caluculating machine of an operating mechanism having a forward and a return stroke of movement, an electrical driving means therefor, a switch adapted to be closed to start the driving means, an operating member for the switch, a starting bar connected to said operating member, and means carried by the operating mechanism for engaging the starting bar connections near the end of the forward stroke of the said mechanism for disconnecting the starting bar from the switch operating member, said last named means also engaging the switch operating member during the return stroke of the operating mechanism to move said member to position to open the switch.

7. The combination in a calculating machine of an operating mechanism having a cycle of movement, a motor for driving said mechanism, a switch adapted to be closed to start the motor, means for automatically disconnecting the operating mechanism from the motor before said mechanism has completed its cycle of movement, means for urging said mechanism to its initial position to complete its cycle of movement, and means actuated by said mechanism after it has been disconnected from the motor for opening said switch.

8. The combination in a calculating machine of an operating mechanism having a forward and a return stroke of movement, a motor connected to actuate said mechanism during its forward stroke, a controlling means for starting and stopping the motor, means for automatically disconnecting the operating mechanism from the motor at the end of the forward stroke of said mechanism, means for urging said mechanism back to its initial position, and means actuated by said mechanism during its return stroke for automatically operating the controlling means to stop the motor.

9. The combination in a calculating machine of an operating mechanism having a forward and a return stroke of movement, an electric motor connected to actuate said mechanism during its forward stroke, a switch adapted to be closed to start the motor, means for automatically disconnecting the operating mechanism from the motor at the end of the forward stroke of said mechanism, means for urging said mechanism back to its initial position, and means actuated by said operating mechanism during its return stroke for automatically opening said switch.

10. The combination in a calculating machine of an operating mechanism, an electric driving means connected to said mechanism for moving it through a stroke of movement, switch mechanism including a member adapted to be operated to close the switch to start the electric driving means, and means for preventing the operating mechanism from being given more than one stroke of movement by the electric driving means when the switch operating member is held in closed position longer than the time required for said driving means to give the mechanism a stroke of movement.

11. The combination in a calculating machine of an operating mechanism, an electric motor connected to said mechanism to give it a stroke of movement, means for disconnecting the motor from said mechanism at the end of a stroke of movement of the mechanism, an electric switch, operating means for closing the switch to start the motor, said operating means being normally in a switch-open position, and means for preventing the operating mechanism of the machine from being given more than one stroke of movement when the switch operating means is held in position to close the switch longer than the time required for the motor to give the operating mechanism a stroke of movement.

12. The combination in a calculating machine of an operating mechanism, a motor for driving said mechanism, a controlling means for said motor urged to a position to allow the motor to remain inactive, a manually operable motor starting bar having connections for operating said controlling means to start the motor, and means operated by actuation of said operating mechanism for disabling the control of the controlling means by the motor bar.

13. The combination in a calculating machine of an operating mechanism having a forward and a return stroke of movement, a motor for driving said mechanism, a switch for said motor normally urged to open position, a manually operable motor starting bar having connections for closing said switch to start said motor, and means operated by said operating mechanism near the end of the forward stroke thereof for automatically disabling the control of the switch by the motor starting bar.

14. The combination in a calculating machine of an operating mechanism having a forward and a return stroke of movement, an electric motor, driving connections between said motor and said operating mechanism, said connections being normally in disconnected position, an electric switch for starting the motor, manipulatable means for closing the switch having provisions for causing the driving connections to be moved to connected position, means for automatically moving the driving connections to disconnected position near the end of the forward stroke of the operating mechanism, and means for automatically disabling the manipulatable means near the end of said forward stroke.

15. The combination in a calculating machine of an operating mechanism having a forward and a return stroke of movement, an electric motor, driving connections between said motor and the operating mechanism, said connections being normally detained in disconnected condition, a switch for the motor, manipulatable means for closing the switch and for simultaneously causing said driving connections to be moved to connected condition, means for automatically moving the driving connections to disconnected position near the end of the forward stroke of the operating mechanism, means for automatically disabling the manipulatable means near the end of said forward stroke, and means for automatically opening said switch.

In testimony whereof, I have subscribed my name.

ALLEN A. HORTON.